(12) United States Patent
Nakanishi et al.

(10) Patent No.: US 12,130,151 B2
(45) Date of Patent: Oct. 29, 2024

(54) INFORMATION PROCESSING DEVICE, INFORMATION PROCESSING SYSTEM, PROGRAM, AND VEHICLE

(71) Applicant: TOYOTA JIDOSHA KABUSHIKI KAISHA, Toyota (JP)

(72) Inventors: Tooru Nakanishi, Nagakute (JP); Tadashi Yamada, Toyota (JP); Josuke Yamane, Nissin (JP); Mitsuhiro Miura, Toyota (JP); Tomo Sasaki, Toyota (JP); Tomoyuki Kozuka, Toyota (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 17/146,618

(22) Filed: Jan. 12, 2021

(65) Prior Publication Data

US 2021/0293571 A1 Sep. 23, 2021

(30) Foreign Application Priority Data

Mar. 18, 2020 (JP) .................................. 2020-047916

(51) Int. Cl.
*G01C 21/36* (2006.01)
*G01C 21/28* (2006.01)
(Continued)

(52) U.S. Cl.
CPC .......... *G01C 21/3691* (2013.01); *G01C 21/28* (2013.01); *G01C 21/3415* (2013.01);
(Continued)

(58) Field of Classification Search
CPC ................ G01C 21/3691; G01C 21/28; G01C 21/3415; G01C 21/3492; G01C 21/3453;
(Continued)

(56) References Cited

U.S. PATENT DOCUMENTS 5,680,119 A * 10/1997 Magliari ................ G08G 1/087
340/904
6,351,698 B1 * 2/2002 Kubota .............. G01C 21/3608
704/E15.045
(Continued)

FOREIGN PATENT DOCUMENTS

CN 107031632 A 8/2017
JP 2007-051974 A 3/2007
(Continued)

*Primary Examiner* — Tuan C To
*Assistant Examiner* — Dominick Mulder
(74) *Attorney, Agent, or Firm* — Oblon, McClelland, Maier & Neustadt, L.L.P.

(57) ABSTRACT

An information processing device that provides a travel route to a destination to an occupant of a vehicle includes a controller. The controller is configured to acquire travel information obtained by another vehicle that travels on a candidate route to the destination set by the occupant from a second point in time prior to a first point in time when the destination is set to the first point in time in relation to traveling of the other vehicle, and to decide the travel route optimal for driving of the vehicle to the destination based on the acquired travel information.

16 Claims, 9 Drawing Sheets

(51) Int. Cl.
  *G01C 21/34* (2006.01)
  *G08G 1/0967* (2006.01)
  *G08G 1/0968* (2006.01)
  *G05D 1/00* (2006.01)

(52) U.S. Cl.
  CPC ... *G01C 21/3492* (2013.01); *G08G 1/096791* (2013.01); *G08G 1/096805* (2013.01); *G05D 1/0214* (2013.01)

(58) Field of Classification Search
  CPC ....... G08G 1/096791; G08G 1/096805; G08G 1/096844; G05D 1/0214; B60K 2370/166; B60K 2370/168; B60K 2370/169; B60K 2370/592; B60K 35/00; B60H 1/00771
  USPC .......................................................... 701/423
  See application file for complete search history.

(56) References Cited

U.S. PATENT DOCUMENTS

| | | | | |
|---|---|---|---|---|
| 6,434,480 | B1* | 8/2002 | Kubota | G08G 1/0962 455/455 |
| 10,794,715 | B1* | 10/2020 | Truong | G01C 21/3446 |
| 11,126,180 | B1* | 9/2021 | Kobilarov | G05B 13/0265 |
| 11,562,579 | B2* | 1/2023 | Kim | G06V 40/20 |
| 2002/0120396 | A1* | 8/2002 | Boies | G06Q 10/047 340/995.19 |
| 2004/0249568 | A1* | 12/2004 | Endo | G08G 1/096888 701/410 |
| 2006/0294429 | A1* | 12/2006 | Natsume | B60R 25/04 714/31 |
| 2008/0106436 | A1* | 5/2008 | Breed | G05D 1/0246 340/905 |
| 2008/0167810 | A1* | 7/2008 | Wildervanck | G01C 21/34 701/431 |
| 2009/0002193 | A1* | 1/2009 | Cemper | G08G 1/096783 340/901 |
| 2009/0248286 | A1* | 10/2009 | Nagase | G08G 1/096844 701/117 |
| 2010/0132388 | A1* | 6/2010 | Oyobe | B60L 1/02 62/157 |
| 2011/0098877 | A1* | 4/2011 | Stahlin | G08G 1/161 701/31.4 |
| 2011/0215758 | A1* | 9/2011 | Stahlin | H04B 3/542 320/109 |
| 2012/0158301 | A1* | 6/2012 | Schilling | G01C 21/3492 701/533 |
| 2013/0044008 | A1* | 2/2013 | Gafford | G08G 1/205 340/471 |
| 2014/0012494 | A1* | 1/2014 | Cudak | G01C 21/3415 701/465 |
| 2014/0032086 | A1* | 1/2014 | Wijaya | F02N 11/0848 701/112 |
| 2014/0347196 | A1* | 11/2014 | Schulz | G08G 1/147 340/932.2 |
| 2015/0179066 | A1* | 6/2015 | Rider | G08G 1/04 701/31.5 |
| 2015/0276422 | A1* | 10/2015 | Bouve | G08G 1/0129 701/538 |
| 2016/0075333 | A1* | 3/2016 | Sujan | G06Q 50/30 701/25 |
| 2016/0307446 | A1* | 10/2016 | Edakunni | G01C 21/3691 |
| 2017/0038775 | A1* | 2/2017 | Park | F02D 41/021 |
| 2017/0075036 | A1* | 3/2017 | Pikhletsky | G01R 33/091 |
| 2017/0199523 | A1* | 7/2017 | Barton-Sweeney | G05D 1/0214 |
| 2017/0232891 | A1* | 8/2017 | Nordbruch | B60Q 1/543 701/23 |
| 2017/0234689 | A1* | 8/2017 | Gibson | B60W 60/0015 701/25 |
| 2017/0328725 | A1* | 11/2017 | Schlesinger | G01C 21/3492 |
| 2017/0349148 | A1* | 12/2017 | Bojanowski | G01C 21/28 |
| 2017/0368906 | A1* | 12/2017 | Inui | B60H 1/00771 |
| 2018/0025235 | A1* | 1/2018 | Fridman | G06T 7/12 382/103 |
| 2018/0058867 | A1* | 3/2018 | Sasaki | G01C 21/3492 |
| 2018/0080783 | A1* | 3/2018 | Kim | G01C 21/3694 |
| 2018/0099542 | A1* | 4/2018 | Sakakibara | B60H 3/00 |
| 2018/0141563 | A1* | 5/2018 | Becker | G06T 7/11 |
| 2018/0217670 | A1* | 8/2018 | Cho | G06F 3/0446 |
| 2018/0361823 | A1* | 12/2018 | Igarashi | B60H 1/00771 |
| 2019/0061765 | A1* | 2/2019 | Marden | G05D 1/0214 |
| 2019/0126949 | A1* | 5/2019 | Tashiro | B60H 1/00771 |
| 2019/0186929 | A1* | 6/2019 | Iwata | G01C 21/3691 |
| 2019/0344637 | A1* | 11/2019 | Saito | G08G 1/0967 |
| 2019/0384294 | A1* | 12/2019 | Shashua | G06V 20/584 |
| 2020/0124435 | A1* | 4/2020 | Edwards | G01C 21/3415 |
| 2020/0164717 | A1* | 5/2020 | Mullett | B60H 1/00771 |
| 2020/0180639 | A1* | 6/2020 | Mizoguchi | G05D 1/0214 |
| 2021/0129862 | A1* | 5/2021 | Kim | G01C 21/3658 |
| 2021/0209946 | A1* | 7/2021 | Eilertsen | G08G 1/096827 |
| 2021/0379995 | A1* | 12/2021 | Watanabe | B60K 35/00 |

FOREIGN PATENT DOCUMENTS

| | | |
|---|---|---|
| JP | 2012-127861 A | 7/2012 |
| JP | 2017-102556 A | 6/2017 |
| JP | 2019-137243 A | 8/2019 |

\* cited by examiner

FIG. 3

| CANDIDATE ROUTE | FIRST OPERATION INFORMATION | WEATHER INFORMATION | | AIR CONDITIONING |
| --- | --- | --- | --- | --- |
| | | PRECIPITATION | HUMIDITY | |
| A1 | HIGH SPEED | LARGE | HIGH | DEHUMIDIFYING |
| B1 | LOW SPEED | SMALL | APPROPRIATE | STOP |
| C1 | STOP | ZERO | LOW | HUMIDIFYING |
| ... | ... | ... | ... | ... |

FIG. 4

| CANDIDATE ROUTE | ROAD SURFACE INFORMATION | | CURVE INFORMATION | | DRIVING INFORMATION |
|---|---|---|---|---|---|
| | ROAD SURFACE $\mu$ | ROAD SURFACE GRADIENT | THE NUMBER OF CURVES | R | |
| A2 | 0.9 | 1 % | 5 | 300 m | ACCELERATION |
| B2 | 0.5 | 5 % | 1 | 500 m | CONSTANT SPEED |
| C2 | 0.2 | 8 % | 10 | 100 m | DECELERATION |
| ... | ... | ... | ... | ... | ... |

FIG. 5

| CANDIDATE ROUTE | SECOND OPERATION INFORMATION | PARKING AND STOPPING INFORMATION | DRIVING INFORMATION |
|---|---|---|---|
| A3 | REMAINING ON FOR LONG TIME | PARKED | RIGHT LANE |
| B3 | REMAINING OFF | NONE | LEFT LANE |
| C3 | REMAINING ON FOR SHORT TIME | STOPPED | ANY TRAVELING LANE |
| ... | ... | ... | ... |

INFORMATION PROCESSING DEVICE, INFORMATION PROCESSING SYSTEM, PROGRAM, AND VEHICLE

CROSS-REFERENCE TO RELATED APPLICATION

This application claims priority to Japanese Patent Application No. 2020-047916 filed on Mar. 18, 2020, incorporated herein by reference in its entirety.

BACKGROUND

1. Technical Field

The present disclosure relates to an information processing device, an information processing system, a program, and a vehicle.

2. Description of Related Art

In the related art, the technique relating to a navigation system that provides a travel route from the current position of a vehicle to a destination input by an occupant of the vehicle to the occupant of the vehicle has been known. For example, Japanese Unexamined Patent Application Publication No. 2007-051974 (JP 2007-051974 A) discloses a weather information center that predicts weather that the vehicle encounters on the travel route and provides weather information, and a route information providing device that notifies a driver of the weather information predicted to be encountered during traveling.

SUMMARY

The travel route to the destination provided to the occupant of the vehicle by the navigation system in the related art is not always optimized for driving of the vehicle to the destination based on various information including weather information, road surface information, curve information, and parking and stopping information on the travel route. As a result, the comfort and the safety of the occupant are reduced in driving the vehicle to the destination.

An object of the present disclosure made in view of such circumstances is to improve the comfort or the safety of the occupant in driving the vehicle to the destination.

A first aspect of the present disclosure relates to an information processing device that provides a travel route to a destination to an occupant of a vehicle, the device including a controller configured to acquire travel information obtained by another vehicle that travels on a candidate route to the destination set by the occupant from a second point in time prior to a first point in time when the destination is set to the first point in time in relation to traveling of the other vehicle, and to decide the travel route optimal for driving of the vehicle to the destination based on the acquired travel information.

A second aspect of the present disclosure relates to a program causing an information processing device that provides a travel route to a destination to an occupant of a vehicle, to execute an operation including acquiring travel information obtained by another vehicle that travels on a candidate route to the destination set by the occupant from a second point in time prior to a first point in time when the destination is set to the first point in time in relation to traveling of the other vehicle, and deciding the travel route optimal for driving of the vehicle to the destination based on the acquired travel information.

A third aspect of the present disclosure relates to a vehicle that presents a travel route to a destination to an occupant, the vehicle including a controller configured to acquire travel information obtained by another vehicle that travels on a candidate route to the destination set by the occupant from a second point in time prior to a first point in time when the destination is set to the first point in time in relation to traveling of the other vehicle, and to decide the travel route optimal for driving of the vehicle to the destination based on the acquired travel information.

With the information processing device, the information processing system, the program, and the vehicle according to the aspects of the present disclosure, the comfort or the safety of the occupant in driving the vehicle to the destination can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table for describing a first example of processing by a controller of the information processing device of FIG. 2;

FIG. 4 is a table for describing a second example of processing by the controller of the information processing device of FIG. 2;

FIG. 5 is a table for describing a third example of processing by the controller of the information processing device of FIG. 2;

DETAILED DESCRIPTION OF EMBODIMENTS

Hereinafter, embodiments of the present disclosure will be described with reference to the drawings.

Figure 1:
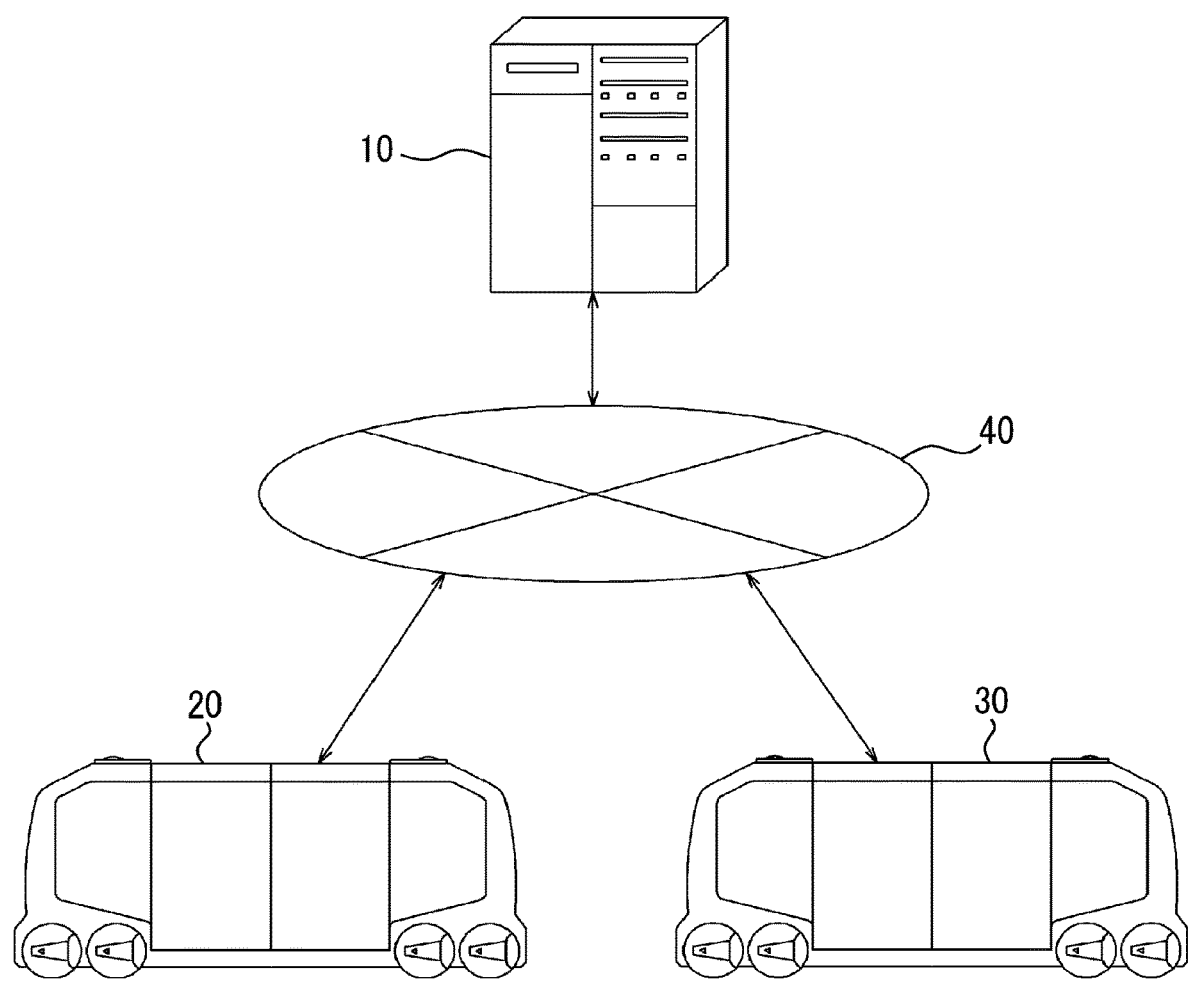
FIG. 1 is a configuration diagram showing a configuration of an information processing system including an information processing device according to an embodiment of the present disclosure.

FIG. 1 is a configuration diagram showing a configuration of an information processing system 1 including an information processing device 10 according to an embodiment of the present disclosure. An outline of the information processing system 1 including the information processing device 10 according to an embodiment of the present disclosure will be mainly described with reference to FIG. 1. The information processing system 1 includes, in addition to the information processing device 10, a first vehicle 20, and a second vehicle 30 as another vehicle. For the sake of simplicity, one information processing device 10, one first vehicle 20, and one second vehicle 30 are shown in FIG. 1, but the numbers of the information processing device 10, the first vehicle 20, and the second vehicle 30 included in the information processing system 1 may be two or more, respectively. The information processing device 10, the first vehicle 20, and the second vehicle 30 are communicably connected to a network 40 including, for example, a mobile communication network and the Internet.

The information processing device 10 provides a travel route to a destination to an occupant of a first vehicle 20. In the present specification, the "destination" includes, for example, a tourist spot and any other place. The information processing device 10 is one server device, or a plurality of server devices that can communicate with each other. The information processing device 10 is not limited thereto, and may be any general-purpose electronic device such as a personal computer (PC) or a smartphone, or another electronic device dedicated to the information processing system 1.

The first vehicle 20 is any vehicle that presents the travel route provided by the information processing device 10 to the occupant. The first vehicle 20 is, for example, an automobile. The first vehicle 20 is not limited thereto, and may be any vehicle that allows a person to get in and can present the travel route in the first vehicle 20. The first vehicle 20 is, for example, an autonomous driving vehicle. The autonomous driving includes, for example, levels 1 to 5 defined in society of automotive engineers (SAE), but is not limited thereto, and may be defined optionally. The first vehicle 20 is not limited to the autonomous driving vehicle, and may be any vehicle driven by a driver.

The second vehicle 30 is any vehicle that travels on the candidate route to the destination set by the occupant of the first vehicle 20 from a second point in time prior to a first point in time when the destination is set to the first point in time, and provides travel information to the information processing device 10. In the present specification, the "travel information" includes, for example, any information obtained by the second vehicle 30 when the second vehicle 30 travels on the candidate route in relation to traveling of the second vehicle 30.

For example, the travel information includes any first information relating to the second vehicle 30 itself including the speed of the second vehicle 30, the longitudinal acceleration, the lateral acceleration, the angular velocity, the steering angle, first operation information on the windshield wiper, second operation information on the hazard lights, set information on snow mode, traveling lane, air conditioning information in a vehicle cabin, the autonomous driving state, and an image captured by an on-vehicle camera. In the present specification, the "air conditioning information" includes, for example, the temperature in the vehicle cabin, the humidity in the vehicle cabin, an operation mode of air conditioning, the set temperature of air conditioning, the set humidity of air conditioning, the set air volume of air conditioning, and the outside air temperature. For example, the travel information includes any second information that can be estimated based on the first information, including road surface information and curve information on the candidate route on which the second vehicle 30 travels. In the present specification, the "road surface information" includes, for example, the road surface mu (μ) and the road surface gradient estimated by a brake electronic control unit (ECU) of the second vehicle 30. In the present specification, the "curve information" includes, for example, the number of curves and radius of curvature (R) that can be estimated based on the first information.

The second vehicle 30 is, for example, an automobile. The second vehicle 30 is not limited thereto, and may be any vehicle that allows a person to get in and can provide the travel information the information processing device 10. The second vehicle 30 is, for example, an autonomous driving vehicle. The autonomous driving includes, for example, levels 1 to 5 defined in SAE, but is not limited thereto, and may be defined optionally. The second vehicle 30 is not limited to the autonomous driving vehicle, and may be any vehicle driven by a driver.

As an outline of the embodiment, the information processing device 10 that provides the travel route to the destination to the occupant of the first vehicle 20 acquires travel information obtained by the second vehicle 30 that travels on a candidate route to the destination set by the occupant from a second point in time prior to a first point in time when the destination is set to the first point in time in relation to traveling of the second vehicle 30. The information processing device 10 decides the travel route optimal for driving of the first vehicle 20 to the destination based on the acquired travel information.

Figure 2:
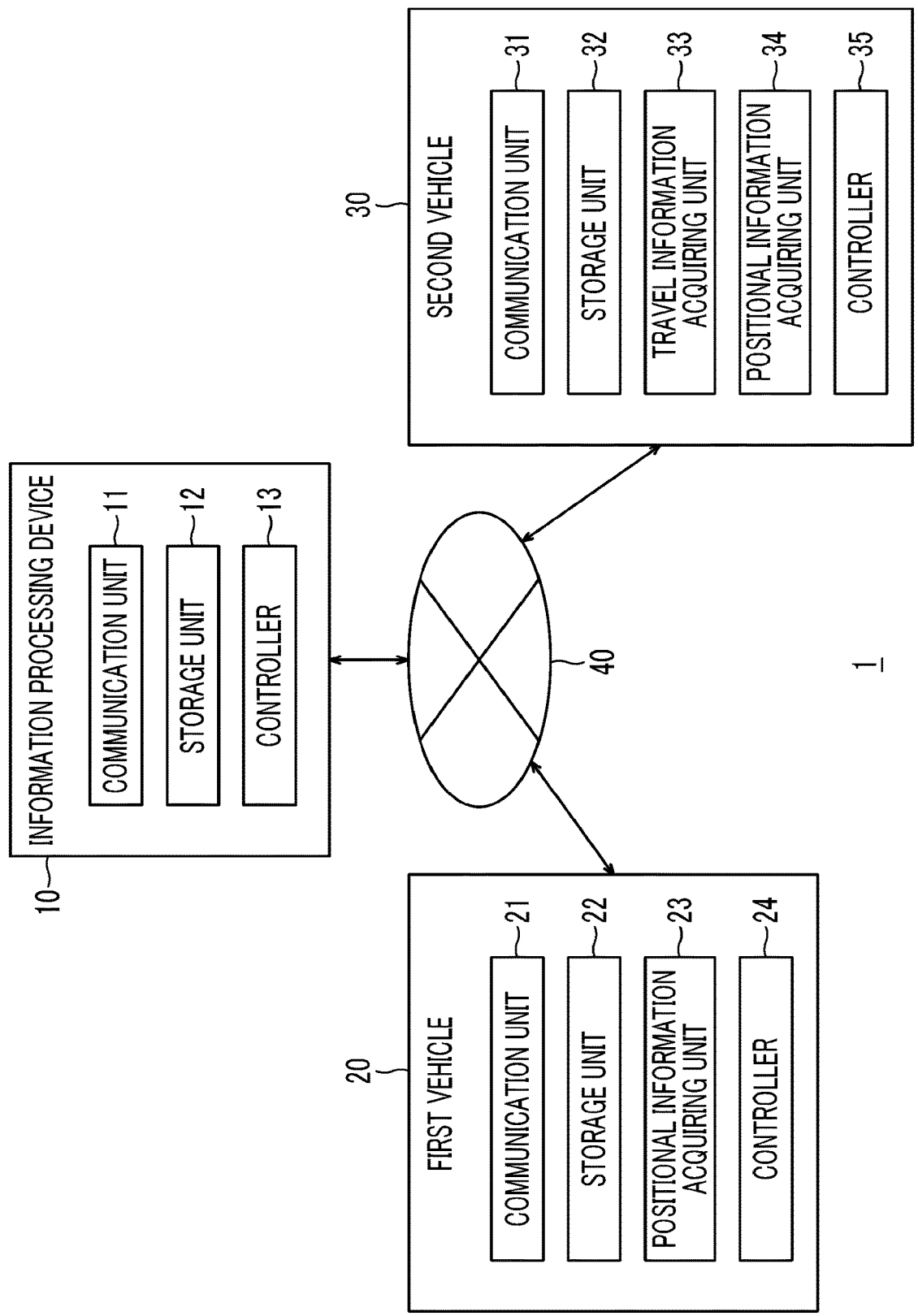
FIG. 2 is a functional block diagram showing schematic configurations of the information processing device, a first vehicle, and a second vehicle of FIG. 1.

Next, configurations of the information processing device 10, the first vehicle 20, and the second vehicle 30 included in the information processing system 1 will be mainly described with reference to FIG. 2. FIG. 2 is a functional block diagram showing schematic configurations of the information processing device 10, the first vehicle 20, and the second vehicle 30 of FIG. 1.

As shown in FIG. 2, the first vehicle 20 includes a communication unit 21, a storage unit 22, a positional information acquiring unit 23, and a controller 24. The communication unit 21, the storage unit 22, the positional information acquiring unit 23, and the controller 24 are communicably connected to each other via an in-vehicle network such as a controller area network (CAN) or a dedicated line.

The communication unit 21 includes a communication module connected to the network 40. For example, the communication unit 21 may include a communication module compatible with mobile communication standards such as 4th generation (4G) and 5th generation (5G). In the embodiment, the first vehicle 20 is connected to the network 40 via the communication unit 21. The communication unit 21 transmits and receives various information via the network 40.

The storage unit 22 is, for example, a semiconductor memory, a magnetic memory, or an optical memory, but is not limited thereto. The storage unit 22 may function as, for example, a main storage device, an auxiliary storage device, or a cache memory. The storage unit 22 stores any information used for the operation of the first vehicle 20. For example, the storage unit 22 may store the system program, the application program, and various information received by the communication unit 21. The information stored in the storage unit 22 may be updatable by the information received from the network 40 via the communication unit 21, for example.

The positional information acquiring unit 23 includes one or more receivers compatible with any satellite positioning system. For example, the positional information acquiring unit 23 may include a global positioning system (GPS) receiver. The positional information acquiring unit 23 acquires a measured value of the position of the first vehicle 20 as the positional information. The positional information includes, for example, an address, the latitude, the longitude, and the altitude. The positional information acquiring unit 23 may always acquire the positional information on the first vehicle 20, or may acquire the positional information regularly or irregularly.

The controller 24 includes one or more processors. In the embodiment, the "processor" is a general-purpose processor or a dedicated processor specialized for specific processing, but is not limited thereto. For example, the controller 24 may include the ECU. The controller 24 is communicably connected to components configuring the first vehicle 20, and controls entire operation of the first vehicle 20.

The controller 24 executes vehicle control for the first vehicle 20 based on the control information acquired from the information processing device 10 or any other device connected to the network 40, for example. The vehicle control is, for example, autonomous driving to the destination, but is not limited thereto.

The controller 24 receives the travel route optimal for driving of the first vehicle 20 to the destination decided by the information processing device 10 based on the travel information acquired by the second vehicle 30, from the information processing device 10 via the network 40 and the communication unit 21.

In a case where the information processing device 10 decides the candidate route on which the second vehicle 30 travels as the optimal travel route, the controller 24 receives air conditioning information in the vehicle cabin of the first vehicle 20 when the first vehicle 20 travels on the travel route decided by the information processing device 10 from the information processing device 10 via the network 40 and the communication unit 21.

In a case where the information processing device 10 decides the candidate route on which the second vehicle 30 travels as the optimal travel route, the controller 24 receives driving information when the first vehicle 20 travels on the travel route decided by the information processing device 10 from the information processing device 10 via the network 40 and the communication unit 21. In the present specification, the "driving information" includes, for example, various information relating to the first vehicle 20 including the speed, the longitudinal acceleration, the lateral acceleration, the angular velocity, the steering angle, operation information on the windshield wiper, operation information on the hazard lights, set information on snow mode, traveling lane, and the autonomous driving state.

Next, the configuration of the second vehicle 30 included in the information processing system 1 will be mainly described. As shown in FIG. 2, the second vehicle 30 includes a communication unit 31, a storage unit 32, a travel information acquiring unit 33, a positional information acquiring unit 34, and a controller 35. The communication unit 31, the storage unit 32, the travel information acquiring unit 33, the positional information acquiring unit 34, and the controller 35 are communicably connected to each other via an in-vehicle network such as the CAN or a dedicated line.

The communication unit 31 includes a communication module connected to the network 40. For example, the communication unit 31 may include a communication module compatible with mobile communication standards such as 4G and 5G. In the embodiment, the second vehicle 30 is connected to the network 40 via the communication unit 31. The communication unit 31 transmits and receives various information via the network 40.

The storage unit 32 is, for example, a semiconductor memory, a magnetic memory, or an optical memory, but is not limited thereto. The storage unit 32 may function as, for example, a main storage device, an auxiliary storage device, or a cache memory. The storage unit 32 stores any information used for the operation of the second vehicle 30. For example, the storage unit 32 may store the system program, the application program, and various information received by the communication unit 31. The information stored in the storage unit 32 may be updatable by the information received from the network 40 via the communication unit 31, for example.

The travel information acquiring unit 33 includes any module that can acquire various travel information. For example, the travel information acquiring unit 33 includes a sensor module that can acquire the above-described various first information relating to the second vehicle 30 itself. For example, the travel information acquiring unit 33 includes a module that can estimate the above-described second information based on the first information. For example, the travel information acquiring unit 33 includes the brake ECU that can estimate the road surface information including the road surface μ and the road surface gradient.

The positional information acquiring unit 34 includes one or more receivers compatible with any satellite positioning system. For example, the positional information acquiring unit 34 may include the GPS receiver. The positional information acquiring unit 34 acquires a measured value of the position of the second vehicle 30 as the positional information. The positional information includes, for example, an address, the latitude, the longitude, and the altitude. The positional information acquiring unit 34 may always acquire the positional information on the second vehicle 30, or may acquire the positional information regularly or irregularly.

The controller 35 includes one or more processors. In the embodiment, the "processor" is a general-purpose processor or a dedicated processor specialized for specific processing, but is not limited thereto. For example, the controller 35 may include the ECU. The controller 35 is communicably connected to components configuring the second vehicle 30, and controls entire operation of the second vehicle 30.

The controller 35 transmits the travel information acquired by the travel information acquiring unit 33 when the second vehicle 30 travels from the second point in time to the first point in time on the candidate route to the information processing device 10 via the communication unit 31 and the network 40.

Next, the configuration of the information processing device 10 included in the information processing system 1 will be mainly described. As shown in FIG. 2, the information processing device 10 includes a communication unit 11, a storage unit 12, and a controller 13.

The communication unit 11 includes a communication module connected to the network 40. For example, the communication unit 11 may include a communication module compatible with mobile communication standards such as 4G and 5G or the Internet standards. In the embodiment, the information processing device 10 is connected to the network 40 via the communication unit 11. The communication unit 11 transmits and receives various information via the network 40.

The storage unit 12 is, for example, a semiconductor memory, a magnetic memory, or an optical memory, but is not limited thereto. The storage unit 12 may function as, for example, a main storage device, an auxiliary storage device, or a cache memory. The storage unit 12 stores any information used for the operation of the information processing device 10. For example, the storage unit 12 may store the system program, the application program, and various information received by the communication unit 11. The information stored in the storage unit 12 may be updatable by the information received from the network 40 via the communication unit 11, for example.

The controller 13 includes one or more processors. In the embodiment, the "processor" is a general-purpose processor or a dedicated processor specialized for specific processing, but is not limited thereto. The controller 13 is communicably connected to components configuring the information processing device 10, and controls entire operation of the information processing device 10.

The controller 13 receives the current positional information on the first vehicle 20 acquired by the positional information acquiring unit 23 from the first vehicle 20 via the network 40 and the communication unit 11. The controller 13 specifies the current position of the first vehicle 20 based on the acquired current positional information on the first vehicle 20. In addition, the controller 13 receives information on the destination set by the occupant of the first vehicle 20 from the first vehicle 20 via the network 40 and the communication unit 11. The controller 13 decides at least one candidate route to the destination from the current position based on the destination relating to the acquired information and the specified current position of the first vehicle 20.

The controller 13 acquires the travel information obtained by the second vehicle 30 that travels on the candidate route to the destination set by the occupant of the first vehicle 20 from the second point in time prior to the first point in time when the destination is set to the first point in time in relation to traveling of the second vehicle 30. For example, the controller 13 receives such travel information directly from the second vehicle 30 via the network 40 and the communication unit 11. The present disclosure is not limited thereto, the controller 13 may receive such travel information indirectly from the second vehicle 30 via another device connected to the network 40.

For example, the controller 13 decides the second point in time prior to the first point in time when the destination is set such that an amount of travel information acquired by the second vehicle 30 from the second point in time to the first point in time is equal to or greater than a predetermined threshold value. In the present specification, the "predetermined threshold value" includes, for example, an amount of travel information needed when the information processing device 10 executes processing by using the travel information acquired by the second vehicle 30. For example, the controller 13 may decide the second point in time to a point in time that is one hour before the first point in time, or as needed, may decide the second point in time to a point in time before or after the point in time that is one hour before the first point in time.

The controller 13 decides the travel route optimal for driving of the first vehicle 20 to the destination based on the acquired travel information. For example, in a case where the travel information includes the first operation information on the windshield wiper of the second vehicle 30, the controller 13 estimates weather information on the candidate route based on the acquired first operation information. In this case, the controller 13 further acquires at least one of additional information relating to the weather provided from another device connected to the network 40 or the air conditioning information in the vehicle cabin of the second vehicle 30 to estimate the weather information on the candidate route with the higher precision also based on the above information items. The controller 13 decides the travel route optimal for driving of the first vehicle 20 to the destination based on the estimated weather information. In the present specification, the "weather information" includes, for example, information such as precipitation, humidity, temperature, and wind speed.

FIG. 3 is a table for describing a first example of processing by the controller 13 of the information processing device 10 of FIG. 2. The first example of the processing by the controller 13 will be described more specifically with reference to FIG. 3. In the first example of the processing by the controller 13, the first operation information on the windshield wiper of the second vehicle 30 is used as the travel information.

The controller 13 decides candidate route A1, B1, and C1 as at least one candidate route. In FIG. 3, three candidate routes A1, B1, and C1 are shown, the number of candidate routes decided by the controller 13 may not be three.

The first operation information on the windshield wiper acquired by the second vehicle 30 that travels from the second point in time to the first point in time on the candidate route A1 includes that the windshield wiper of the second vehicle 30 operates at high speed. The first operation information on the windshield wiper acquired by the second vehicle 30 that travels from the second point in time to the first point in time on the candidate route B1 includes that the windshield wiper of the second vehicle 30 operates at low speed. The first operation information on the windshield wiper acquired by the second vehicle 30 that travels from the second point in time to the first point in time on the candidate route C1 includes that the operation of the windshield wiper of the second vehicle 30 is stopped.

In this case, the controller 13 estimates that the precipitation is large and the humidity is high as the weather information on the candidate route A1 based on the first operation information relating to high speed operation of the windshield wiper of the second vehicle 30 acquired for the candidate route A1. The controller 13 estimates that the precipitation is small and the humidity is appropriate as the weather information on the candidate route B1 based on the first operation information relating to low speed operation of the windshield wiper of the second vehicle 30 acquired for the candidate route B1. The controller 13 estimates that the precipitation is zero and the humidity is low as the weather information on the candidate route C1 based on the first operation information relating to stopping of the windshield wiper of the second vehicle 30 acquired for the candidate route C1.

For example, the controller 13 decides the candidate route C1 in which the precipitation is zero, and thus the driver of the first vehicle 20 is most likely to drive the vehicle safely and easily among the plurality of candidate routes as the travel route optimal for driving of the first vehicle 20 to the destination. The present disclosure is not limited thereto, the controller 13 may decide the candidate route B1 in which the humidity is appropriate, and thus the occupant is likely to feel the most comfortableness during driving of the first vehicle 20 as the travel route optimal for driving of the first vehicle 20 to the destination.

In some cases, the controller 13 may decide the candidate route A1 as the travel route optimal for driving of the first vehicle 20 to the destination. For example, the controller 13 may decide the candidate route A1 as the travel route optimal for driving of the first vehicle 20 to the destination in a case where the precipitation is large and the humidity is also high, but the driver of the first vehicle 20 has a high driving skill and the driving to the destination is performed smoothly and in the shortest time. As described above, the controller 13 may decide the travel route optimal for driving of the first vehicle 20 to the destination depending on the degree of the driving skill of the driver of the first vehicle 20 and the driving time, in addition to the estimated weather information.

In a case where one candidate route on which the second vehicle 30 travels is decided as the optimal travel route, the controller 13 decides the air conditioning information in the vehicle cabin when the first vehicle 20 travels on the travel route based on the estimated weather information.

For example, in a case where the candidate route C1 is decided as the optimal travel route, the controller 13 decides an operation mode of air conditioning in the vehicle cabin when the first vehicle 20 travels on the travel route to a humidifying mode based on the estimated weather information indicating that the precipitation is zero and the humidity is low. For example, in a case where the candidate route B1 is decided as the optimal travel route, the controller 13 decides an operation mode of air conditioning in the vehicle cabin when the first vehicle 20 travels on the travel route to a stop mode based on the estimated weather information indicating that the precipitation is small and the humidity is appropriate. For example, in a case where the candidate route A1 is decided as the optimal travel route, the controller 13 decides an operation mode of air conditioning in the vehicle cabin when the first vehicle 20 travels on the travel route to a dehumidifying mode based on the estimated weather information indicating that the precipitation is large and the humidity is high.

The present disclosure is not limited to the above, the controller 13 may decide the driving information relating to the first vehicle 20 based on the weather information on each of the candidate routes A1, B1, and C1 as the travel route, as needed.

FIG. 4 is a table for describing a second example of processing by the controller 13 of the information processing device 10 of FIG. 2. The second example of the processing by the controller 13 will be described more specifically with reference to FIG. 4. In the second example of the processing by the controller 13, at least one of the road surface information or the curve information on the candidate route on which the second vehicle 30 travels is used as the travel information.

The controller 13 decides the travel route optimal for driving of the first vehicle 20 to the destination based on at least one of the road surface information or the curve information, that is acquired.

The controller 13 decides candidate route A2, B2, and C2 as at least one candidate route. In FIG. 4, three candidate routes A2, B2, and C2 are shown, the number of candidate routes decided by the controller 13 may not be three.

In the road surface information acquired by the second vehicle 30 that travels from the second point in time to the first point in time on the candidate route A2, an average road surface μ is 0.9, and an average road surface gradient is 1%. In the road surface information acquired by the second vehicle 30 that travels from the second point in time to the first point in time on the candidate route B2, an average road surface μ is 0.5, and an average road surface gradient is 5%. In the road surface information acquired by the second vehicle 30 that travels from the second point in time to the first point in time on the candidate route C2, an average road surface μ is 0.2, and an average road surface gradient is 8%.

In the curve information acquired by the second vehicle 30 that travels from the second point in time to the first point in time on the candidate route A2, the number of curves is 5, and the average radius of curvature is 300 m. In the curve information acquired by the second vehicle 30 that travels from the second point in time to the first point in time on the candidate route B2, the number of curves is 1, and the radius of curvature is 500 m. In the curve information acquired by the second vehicle 30 that travels from the second point in time to the first point in time on the candidate route C2, the number of curves is 10, and the average radius of curvature is 100 m.

For example, the controller 13 decides the candidate route A2 in which the average road surface μ is the largest, the average road surface gradient is the smallest, and thus the driver of the first vehicle 20 is likely to drive the vehicle safely and easily among the candidate routes as the travel route optimal for driving of the first vehicle 20 to the destination. The present disclosure is not limited thereto, the controller 13 may decide the candidate route B2 in which the number of curves is the smallest, the curves are the gentlest, and thus the occupant is likely to feel the most comfortableness during driving of the first vehicle 20 as the travel route optimal for driving of the first vehicle 20 to the destination. As described above, the controller 13 decides the travel route optimal for driving of the first vehicle 20 to the destination based on the road surface information or the curve information. The present disclosure is not limited thereto, the controller 13 may decide the travel route optimal for driving of the first vehicle 20 to the destination based on both the road surface information and the curve information.

In some cases, the controller 13 may decide the candidate route C2 as the travel route optimal for driving of the first vehicle 20 to the destination. In the candidate route C2, the average road surface μ is the smallest, and the average road surface gradient is the largest. In addition, in the candidate route C2, the number of curves is the largest, and the curve is the sharpest. For example, even in such a case, the controller 13 may decide the candidate route C2 as the travel route optimal for driving of the first vehicle 20 to the destination in a case where the driver of the first vehicle 20 has a high driving skill and the driving to the destination is performed smoothly and in the shortest time. As described above, the controller 13 may decide the travel route optimal for driving of the first vehicle 20 to the destination depending on the degree of the driving skill of the driver of the first vehicle 20 and the driving time, in addition to the road surface information and the curve information.

In a case where one candidate route on which the second vehicle 30 travels is decided as the optimal travel route, the controller 13 decides the driving information when the first vehicle 20 travels on the travel route based on at least one of the road surface information or the curve information, that is acquired.

For example, in a case where the candidate route A2 is decided as the optimal travel route, the controller 13 decides the driving information for accelerating the first vehicle 20 when the first vehicle 20 travels on the travel route based on the road surface information in which the average road surface μ is the largest, and the average road surface gradient is the smallest. For example, in a case where the candidate route A2 is decided as the optimal travel route, the controller 13 decides the driving information for accelerating the first vehicle 20 when the first vehicle 20 travels on the travel route based on the curve information in which the number of curves and the radius of curvature are the averages.

For example, in a case where the candidate route B2 is decided as the optimal travel route, the controller 13 decides the driving information for causing the first vehicle 20 to travel at a constant speed when the first vehicle 20 travels on the travel route based on the road surface information in which the road surface μ and the road surface gradient are moderate levels. For example, in a case where the candidate route B2 is decided as the optimal travel route, the controller 13 decides the driving information for causing the first vehicle 20 to travel at a constant speed when the first vehicle 20 travels on the travel route based on the curve information in which the number of curves is the smallest, and the curve is the gentlest.

For example, in a case where the candidate route C2 is decided as the optimal travel route, the controller 13 decides the driving information for decelerating the first vehicle 20 when the first vehicle 20 travels on the travel route based on the road surface information in which the average road surface μ is the smallest, and the average road surface gradient is the largest. For example, in a case where the candidate route C2 is decided as the optimal travel route, the controller 13 decides the driving information for decelerating the first vehicle 20 when the first vehicle 20 travels on the travel route based on the curve information in which the number of curves is the largest, and the curve is the sharpest.

The present disclosure is not limited to the above, the controller 13 may also decide another driving information relating to the first vehicle 20 including the speed, the angular velocity, the steering angle, set information on snow mode, traveling lane, and the autonomous driving state based on at least one of the road surface information or the curve information on each of the candidate routes A2, B2, and C2 as the travel route, as needed.

FIG. 5 is a table for describing a third example of processing by the controller 13 of the information processing device 10 of FIG. 2. The third example of the processing by the controller 13 will be described more specifically with reference to FIG. 5. In the third example of the processing by the controller 13, the second operation information on the hazard lights of the second vehicle 30 is used as the travel information.

For example, in a case where the travel information includes the second operation information on the hazard lights of the second vehicle 30, the controller 13 estimates parking and stopping information on the candidate route based on the acquired second operation information. In this case, the controller 13 further acquires at least one of additional information relating to the parking and stopping provided from another device connected to the network 40 or the another appropriate travel information on the second vehicle 30 to estimate the parking and stopping information on the candidate route with the higher precision also based on the above information items. The controller 13 decides the travel route optimal for driving of the first vehicle 20 to the destination based on the estimated parking and stopping information.

The controller 13 decides candidate route A3, B3, and C3 as at least one candidate route. In FIG. 5, three candidate routes A3, B3, and C3 are shown, the number of candidate routes decided by the controller 13 may not be three.

The second operation information on the hazard lights acquired by the second vehicle 30 that travels from the second point in time to the first point in time on the candidate route A3 includes that the hazard lights of the second vehicle 30 remain on for a long time. The second operation information on the hazard lights acquired by the second vehicle 30 that travels from the second point in time to the first point in time on the candidate route B3 includes that the hazard lights of the second vehicle 30 remain off. The second operation information on the hazard lights acquired by the second vehicle 30 that travels from the second point in time to the first point in time on the candidate route C3 includes that the hazard lights of the second vehicle 30 remain on for a short time.

In this case, the controller 13 estimates that the second vehicle 30 is parked as the parking and stopping information on the candidate route A3 based on the second operation information regarding the hazard lights of the second vehicle 30 remaining on for a long time acquired for the candidate route A3. The controller 13 estimates that the second vehicle 30 that is parked and stopped is not present as the parking and stopping information on the candidate route B3 based on the second operation information regarding to the hazard lights of the second vehicle 30 remaining off acquired for the candidate route B3. The controller 13 estimates that the second vehicle 30 is stopped as the parking and stopping information on the candidate route C3 based on the second operation information regarding to the hazard lights of the second vehicle 30 remaining on for a short time acquired for the candidate route C3.

For example, the controller 13 decides the candidate route B3 in which the second vehicle 30 that is parked and stopped is not present, and thus the driver of the first vehicle 20 is most likely to drive the vehicle safely and easily among the plurality of candidate routes as the travel route optimal for driving of the first vehicle 20 to the destination. The present disclosure is not limited thereto, and when the second vehicle 30 is stopped solely and the first vehicle 20 actually travels, the controller 13 may decide the candidate route C3 in which the second vehicle 30 is likely to start traveling again as the travel route optimal for driving of the first vehicle 20 to the destination.

In some cases, the controller 13 may decide the candidate route A3 as the travel route optimal for driving of the first vehicle 20 to the destination. For example, the controller 13 may decide the candidate route A3 as the travel route optimal for driving of the first vehicle 20 to the destination in a case where the second vehicle 30 is parked on the travel route, but the driver of the first vehicle 20 has a high driving skill and the driving to the destination is performed smoothly and in the shortest time. As described above, the controller 13 may decide the travel route optimal for driving of the first vehicle 20 to the destination depending on the degree of the driving skill of the driver of the first vehicle 20 and the driving time, in addition to the estimated parking and stopping information.

In a case where one candidate route on which the second vehicle 30 travels is decided as the optimal travel route, the controller 13 decides the driving information when the first vehicle 20 travels on the travel route based on the estimated parking and stopping information.

For example, in a case where the candidate route B3 is decided as the optimal travel route, the controller 13 decides the left lane as the traveling lane of the first vehicle 20 on the travel route based on the estimated parking and stopping information indicating that the second vehicle 30 that is parked and stopped is not present. For example, in a case where the candidate route C3 is decided as the optimal travel route, the controller 13 decides any traveling lane as the traveling lane of the first vehicle 20 on the travel route based on the estimated parking and stopping information indicating that the second vehicle 30 is stopped. For example, in a case where the candidate route A3 is decided as the optimal travel route, the controller 13 decides the right lane as the traveling lane of the first vehicle 20 on the travel route based on the estimated parking and stopping information indicating that the second vehicle 30 is parked.

The present disclosure is not limited to the above, the controller 13 may also decide another driving information relating to the first vehicle 20 including the speed, the longitudinal acceleration, the lateral acceleration, the angular velocity, the steering angle, set information on snow mode, and the autonomous driving state based on the parking and stopping information on each of the candidate routes A3, B3, and C3 as the travel route, as needed.

The controller 13 transmits the decided optimal travel route to the first vehicle 20 via the communication unit 11 and the network 40. The controller 13 transmits the decided air conditioning information to the first vehicle 20 via the communication unit 11 and the network 40. The controller 13 transmits the decided driving information to the first vehicle 20 via the communication unit 11 and the network 40.

Figure 6:
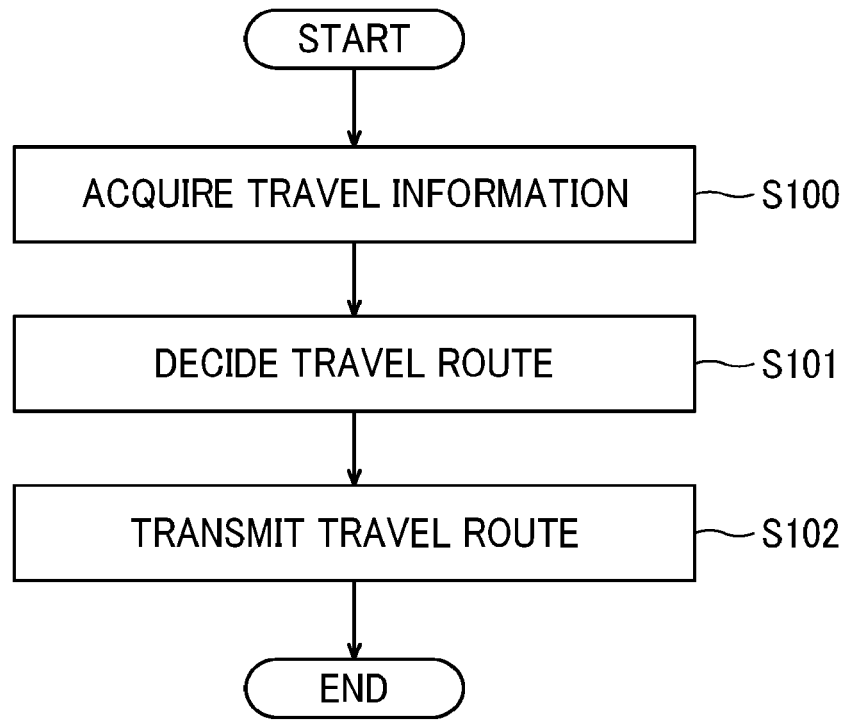
FIG. 6 is a flowchart for describing a first example of an information processing method executed by the information processing device of FIG. 1.

Next, an information processing method executed by the controller 13 of the information processing device 10 according to the embodiment will be described with reference to FIGS. 6 to 9. FIG. 6 is a flowchart for describing a first example of the information processing method executed by the information processing device 10 of FIG. 1.

In step S100, the controller 13 acquires the travel information obtained by the second vehicle 30 that travels on the candidate route to the destination set by the occupant of the first vehicle 20 from the second point in time prior to the first point in time when the destination is set to the first point in time in relation to traveling of the second vehicle 30.

In step S101, the controller 13 decides the travel route optimal for driving of the first vehicle 20 to the destination based on the travel information acquired in step S100.

In step S102, the controller 13 transmits the travel route decided in step S101 to the first vehicle 20 via the communication unit 11 and the network 40.

Figure 7:
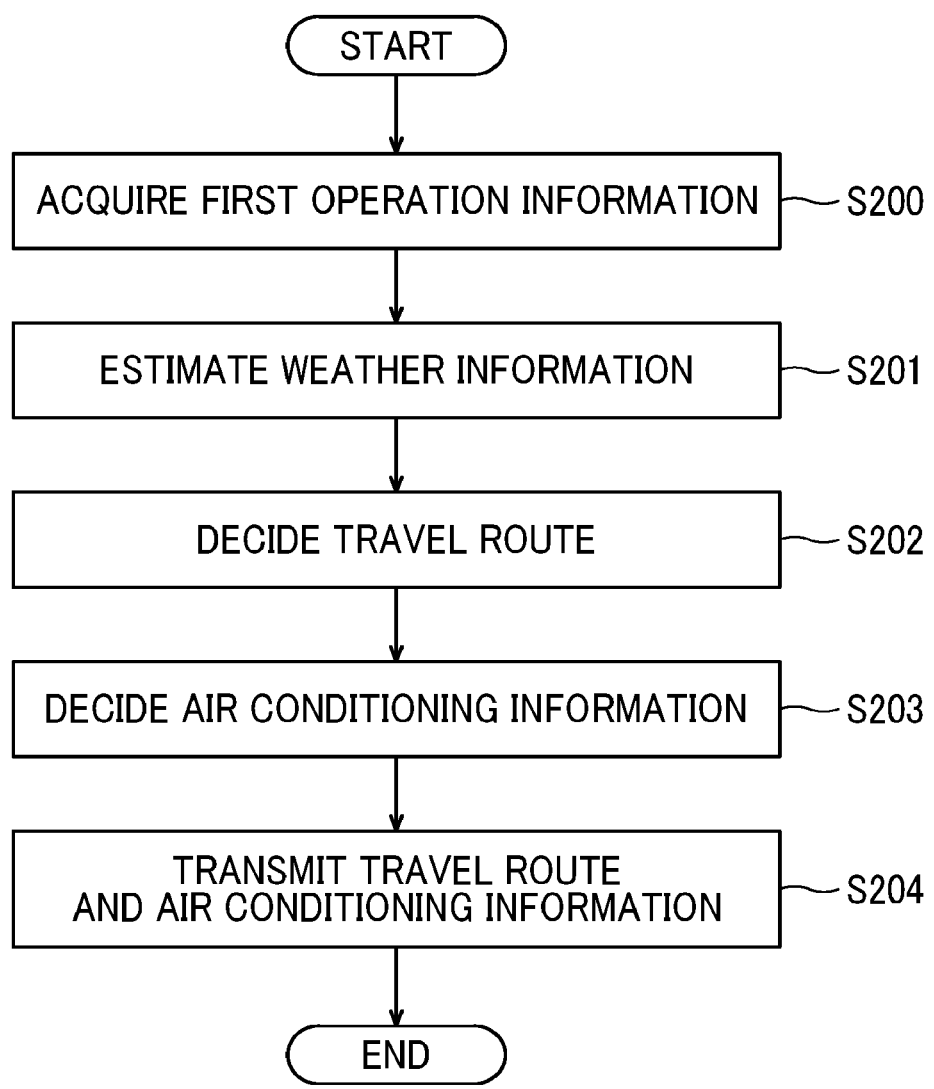
FIG. 7 is a flowchart for describing a second example of the information processing method executed by the information processing device of FIG. 1.

FIG. 7 is a flowchart for describing a second example of the information processing method executed by the information processing device 10 of FIG. 1. FIG. 7 shows a flowchart in a case where the first operation information on the windshield wiper of the second vehicle 30 is used as the travel information.

In step S200, the controller 13 acquires the first operation information on the windshield wiper of the second vehicle 30 as the travel information.

In step S201, the controller 13 estimates the weather information on the candidate route based on the first operation information on the windshield wiper acquired in step S200.

In step S202, the controller 13 decides the travel route optimal for driving of the first vehicle 20 to the destination based on the weather information estimated in step S201.

In step S203, in a case where the candidate route on which the second vehicle 30 travels is decided as the optimal travel route in step S202, the controller 13 decides the air conditioning information in the vehicle cabin when the first vehicle 20 travels on the travel route based on the weather information estimated in step S201.

In step S204, the controller 13 transmits the travel route decided in step S202 and the air conditioning information decided in step S203 to the first vehicle 20 via the communication unit 11 and the network 40.

Figure 8:
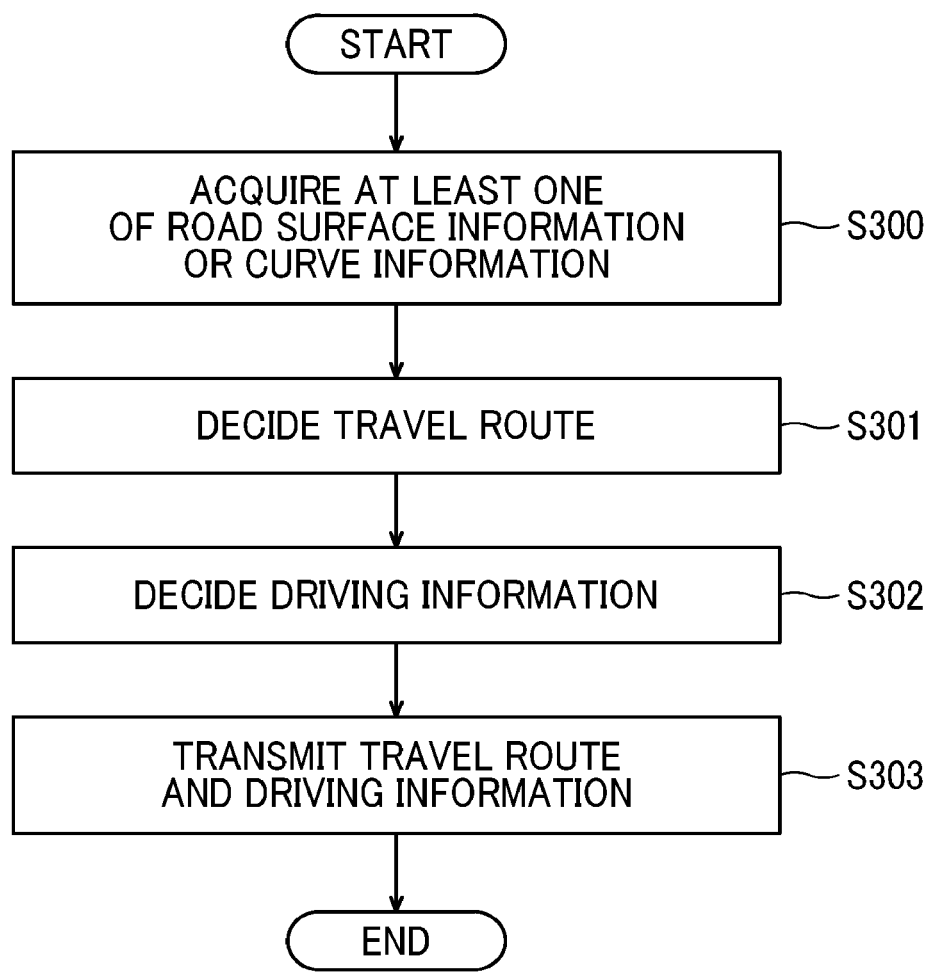
FIG. 8 is a flowchart for describing a third example of the information processing method executed by the information processing device of FIG. 1.

FIG. 8 is a flowchart for describing a third example of the information processing method executed by the information processing device 10 of FIG. 1. FIG. 8 shows a flowchart in a case where at least one of the road surface information or the curve information on the candidate route on which the second vehicle 30 travels as the travel information.

In step S300, the controller 13 acquires at least one of the road surface information or the curve information on the candidate route on which the second vehicle 30 travels as the travel information.

In step S301, the controller 13 decides the travel route optimal for driving of the first vehicle 20 to the destination based on at least one of the road surface information or the curve information acquired in step S300.

In step S302, in a case where the candidate route on which the second vehicle 30 travels is decided as the optimal travel route in step S301, the controller 13 decides driving information when the first vehicle 20 travels on the travel route based on at least one of the road surface information or the curve information acquired in step S300.

In step S303, the controller 13 transmits the travel route decided in step S301 and the driving information decided in step S302 to the first vehicle 20 via the communication unit 11 and the network 40.

Figure 9:
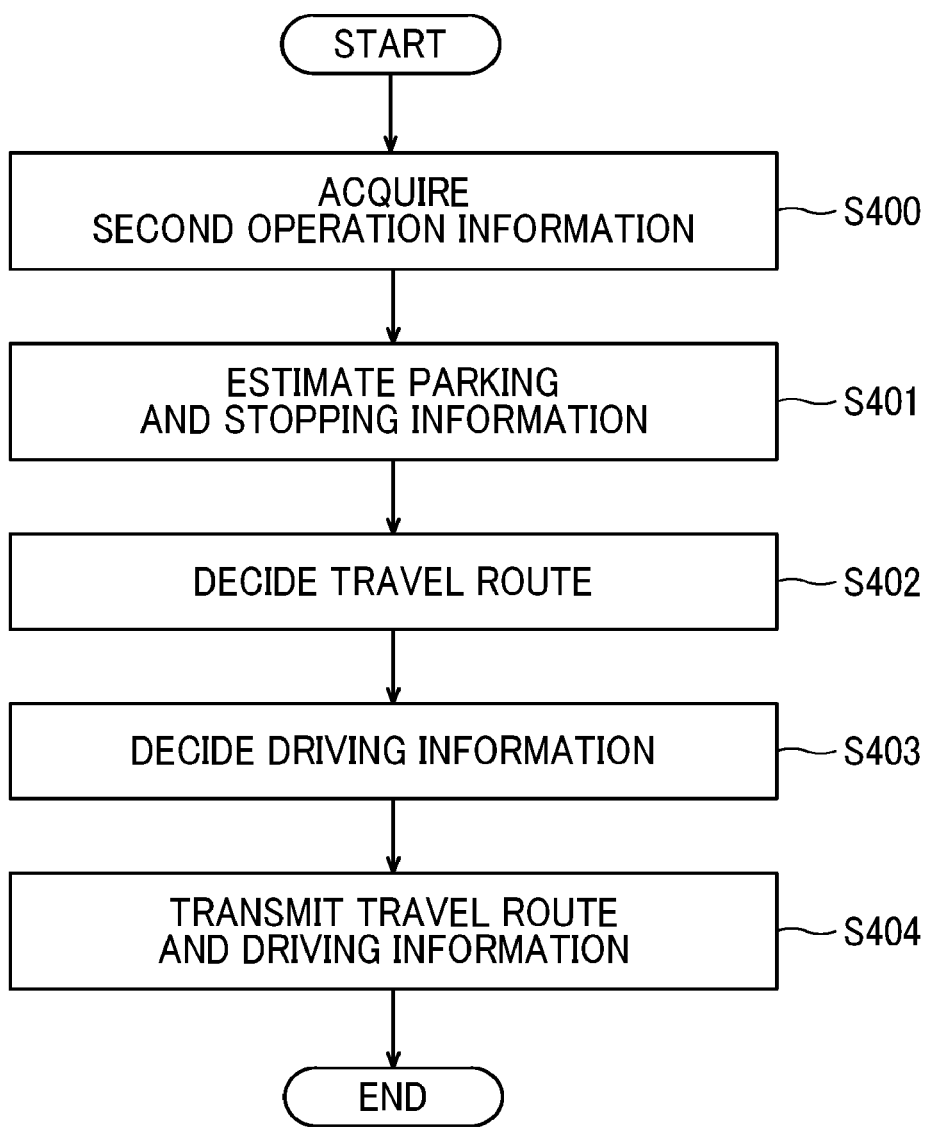
FIG. 9 is a flowchart for describing a fourth example of the information processing method executed by the information processing device of FIG. 1.

FIG. 9 is a flowchart for describing a fourth example of the information processing method executed by the information processing device 10 of FIG. 1. FIG. 9 shows a flowchart in a case where the second operation information on the hazard lights of the second vehicle 30 is used as the travel information.

In step S400, the controller 13 acquires the second operation information on the hazard lights of the second vehicle 30 as the travel information.

In step S401, the controller 13 estimates the parking and stopping information on the candidate route based on the second operation information on the hazard lights acquired in step S400.

In step S402, the controller 13 decides the travel route optimal for driving of the first vehicle 20 to the destination based on the parking and stopping information estimated in step S401.

In step S403, in a case where the candidate route on which the second vehicle 30 travels is decided as the optimal travel route in step S402, the controller 13 decides the driving information when the first vehicle 20 travels on the travel route based on the parking and stopping information estimated in step S401.

In step S404, the controller 13 transmits the travel route decided in step S402 and the driving information decided in step S403 to the first vehicle 20 via the communication unit 11 and the network 40.

According to the embodiment, the comfort or the safety of the occupant in driving the first vehicle 20 to the destination can be improved. For example, by acquiring the travel information on the second vehicle 30 that travels on the candidate route from the second point in time to the first point in time, the information processing device 10 can decide the optimal travel route based on the accurate information with a range limited to immediately before the first point in time and to the candidate route. For example, the information processing device 10 can decide, based on the travel information, the travel route on which the driver of the first vehicle 20 is most likely to drive the vehicle safely and easily. For example, the information processing device 10 can decide, based on the travel information, the travel route on which the occupant is likely to feel the most comfortableness during driving of the first vehicle 20. For decision of the travel route, the information processing device 10 can decide the travel route optimal for driving of the first vehicle 20 to the destination with the high precision by using the travel information on the second vehicle 30 that actually travels on the same route.

The information processing device 10 can improve the precision of the weather information on the candidate route by estimating the weather information on the candidate route based on the acquired first operation information on the windshield wiper. The information processing device 10 can estimate the accurate weather information regarding a range limited on the candidate route unlike the information regarding a certain range including the candidate route, such as the weather information in the related art, also based on the positional information on the second vehicle 30 acquired by the positional information acquiring unit 34, for example. In addition, the information processing device 10 can accurately estimate the weather information immediately before the first point in time based on the first operation information on the windshield wiper of the second vehicle 30 that travels on the candidate route from the second point in time to the first point in time. The information processing device 10 can appropriately decide the travel route in which a risk factor relating to driving of the first vehicle 20 or an uncomfortable factor for the occupant due to the weather information is suppressed by deciding the optimal travel route based on the weather information.

In a case where the candidate route on which the second vehicle 30 travels is decided as the optimal travel route, the information processing device 10 decides the air conditioning information in the vehicle cabin when the first vehicle 20 travels on the travel route based on the estimated weather information. Therefore, the information processing device 10 can optimize the air conditioning information in the vehicle cabin of the first vehicle 20 in accordance with the weather information estimated with the high precision. As a result, the comfort of the occupant of the first vehicle 20 when the first vehicle 20 travels to the destination on the travel route is improved.

The information processing device 10 can appropriately decide the travel route in which a risk factor relating to driving of the first vehicle 20 or an uncomfortable factor for the occupant due to at least one of the road surface information or the curve information is suppressed by deciding the optimal travel route based on at least one of the road surface information or the curve information on the candidate route on which the second vehicle 30 travels.

In a case where the candidate route on which the second vehicle 30 travels is decided as the optimal travel route, the information processing device 10 decides the driving information when the first vehicle 20 travels on the travel route based on at least one of the road surface information or the curve information, that is acquired. Therefore, the information processing device 10 can optimize the driving information on the first vehicle 20 in accordance with at least one of the road surface information or the curve information, that is acquired. As a result, the comfort and the safety of the occupant of the first vehicle 20 when the first vehicle 20 travels to the destination on the travel route is improved.

The information processing device 10 can improve the precision of the parking and stopping information on the candidate route by estimating the parking and stopping information on the candidate route based on the acquired second operation information on the hazard lights. The information processing device 10 can estimate the accurate parking and stopping information on the candidate route in which the position is specified also based on the positional information on the second vehicle 30 acquired by the positional information acquiring unit 34. The information processing device 10 can appropriately decide the travel route in which a risk factor relating to driving of the first vehicle 20 or an uncomfortable factor for the occupant due to the parking and stopping information is suppressed by deciding the optimal travel route based on the parking and stopping information.

In a case where the candidate route on which the second vehicle 30 travels is decided as the optimal travel route, the information processing device 10 decides the driving information when the first vehicle 20 travels on the travel route based on the estimated parking and stopping information. Therefore, the information processing device 10 can optimize the driving information on the first vehicle 20 in accordance with the parking and stopping information estimated with the high precision. As a result, the comfort and the safety of the occupant of the first vehicle 20 when the first vehicle 20 travels to the destination on the travel route is improved.

Although the present disclosure has been described based on the drawings and the embodiments, it should be noted that those skilled in the art can easily make various variations and modifications based on the present disclosure. Therefore, it should be noted that these variations and modifications are included in the scope of the present disclosure. For example, the functions and the like included in each configuration or each step can be rearranged so as not to logically contradict, and a plurality of configurations or steps can be combined or divided into one.

For example, at least a part of the processing operation executed in the information processing device 10 in the embodiment may be executed in at least one of the first vehicle 20 or the second vehicle 30. For example, instead of the information processing device 10, the first vehicle 20 itself may execute the processing operation relating to the information processing device 10. Also, at least a part of the processing operation executed in at least one of the first vehicle 20 or the second vehicle 30 may be executed in the information processing device 10.

For example, a general-purpose electronic device such as a smartphone or a computer may be configured to function as the information processing device 10 according to the embodiment. Specifically, a program describing the processing content for realizing each function of the information processing device 10 according to the embodiment is stored in the memory of the electronic device, and the program of the electronic device is read and executed by the processor of the electronic device. Therefore, the disclosure according to the embodiment can be realized as the program executable by the processor. Alternatively, the disclosure according to the embodiment can also be realized as a non-transitory computer-readable medium that stores the program executable by one or more processors to cause the information processing device 10 or the like according to the embodiment to execute each function. It should be understood that the scope of the present disclosure includes these configurations.

For example, the information processing device 10 described in the embodiment may be mounted on the first vehicle 20. In this case, the information processing device 10 may directly perform information communication with the first vehicle 20 without the network 40. In this case, the information processing device 10 mounted on the first vehicle 20 may execute the acquisition and presentation of information by any input interface and output interface provided on the first vehicle 20.

For example, in a case where instead of the information processing device 10, the first vehicle 20 itself executes the processing operation relating to the information processing device 10, and in a case where the information processing device 10 is mounted on the first vehicle 20, the first vehicle 20 or the information processing device 10 may directly execute transmission and reception of the information with the second vehicle 30 without the network 40 through the inter-vehicle communication between the first vehicle 20 and the second vehicle 30.

For example, the second vehicle 30 is not limited to one, the information processing device 10 may acquire the travel information from a plurality of the second vehicles 30 each of which travels on the candidate route to execute the same processing as above.

For example, the information processing device 10 may acquire the air conditioning information when the second vehicle 30 travels on the corresponding candidate route instead of or in addition to the estimated weather information, and decide the air conditioning information in the vehicle cabin when the first vehicle 20 travels on the travel route based on the acquired air conditioning information. For example, the information processing device 10 may directly decide the air conditioning information when the second vehicle 30 travels on the corresponding candidate route as the air conditioning information in the vehicle cabin when the first vehicle 20 travels on the travel route.

For example, the information processing device 10 may acquire the first information when the second vehicle 30 travels on the corresponding candidate route instead of or in addition to the acquired second information including the road surface information and the curve information on the candidate route, and decide the driving information when the first vehicle 20 travels on the travel route based on the acquired first information. For example, the information processing device 10 may directly decide the first information when the second vehicle 30 travels on the corresponding candidate route as the driving information when the first vehicle 20 travels on the travel route.

For example, the information processing device 10 may acquire the first information when the second vehicle 30 travels on the corresponding candidate route instead of or in addition to the estimated parking and stopping information, and decide the driving information when the first vehicle 20 travels on the travel route based on the acquired first information. For example, the information processing device 10 may directly decide the first information when the second vehicle 30 travels on the corresponding candidate route as the driving information when the first vehicle 20 travels on the travel route.

For example, the information processing device 10 may transmit the estimated weather information, the acquired travel information, and the estimated parking and stopping information to the first vehicle 20 via the communication unit 11 and the network 40, as needed.

What is claimed is:

1. An information processing device that provides a travel route to a destination to an occupant of a first vehicle, the device comprising:
    a controller configured to:
        acquire travel information obtained by a second vehicle that travels on a candidate route to the destination set by the occupant from a second point in time prior to a first point in time when the destination is set by the occupant of the first vehicle, the travel information including first operation information on a windshield wiper of the second vehicle,
        estimate weather information on the candidate route on which the second vehicle travels based on the first operation information on the windshield wiper of the second vehicle, the estimated weather information including information on precipitation and information on humidity, the first operation information on the windshield wiper of the second vehicle having been acquired by the controller from a source external to the information processing device,
        decide an optimal travel route for driving of the first vehicle to the destination based on the acquired travel information and the estimated weather information, and
        in a case where the candidate route on which the second vehicle travels is decided as the optimal travel route, decide an operation mode of air conditioning in a vehicle cabin of the first vehicle when the first vehicle travels on the optimal travel route based on the information on the humidity that is estimated based upon the acquired first operation information that is obtained by the second vehicle, wherein
    the first vehicle is configured to autonomously control itself based upon the optimal travel route and the decided operation mode of the air conditioning,
    the controller is configured to decide the optimal travel route as a route with more precipitation,
    the travel information includes second operation information on hazard lights of the second vehicle including a length of time in which the hazard lights remain on, and
    the controller is configured to:
        estimate parking and stopping information including whether the second vehicle is parked on the candidate route and whether the second vehicle is parked and stopped on the candidate route based on the acquired second operation information,
        decide the optimal travel route based on the estimated parking and stopping information,
        in the case where the candidate route on which the second vehicle travels is decided as the optimal travel route, the controller decides driving information of the first vehicle, including which of a left lane and a right lane to travel in, when the first vehicle travels on the optimal travel route based on the estimated parking and stopping information, and
        determine the second point in time such that an amount of travel information acquired by the second vehicle from the second point in time to the first point in time is equal to or greater than a predetermined threshold value, the predetermined threshold including an amount of travel information needed when the controller decides the optimal travel route by using the travel information acquired by the second vehicle.

2. The information processing device according to claim 1, wherein the travel information includes at least one of road surface information and curve information on the candidate route on which the second vehicle travels.

3. The information processing device according to claim 2, wherein, in the case where the candidate route on which the second vehicle travels is decided as the optimal travel route, the controller decides the driving information of the first vehicle when the first vehicle travels on the optimal travel route based on the at least one of the road surface information and the curve information that is acquired.

4. The information processing device according to claim 1, wherein
    the information processing device is a first element of an information processing system;
    the first vehicle is a second element of the information processing system;
    the second vehicle is a third element of the information processing system;
    the first vehicle is configured to present the optimal travel route, provided by the information processing device, to the occupant; and the second vehicle is configured to:
  travel, from the second point in time, on the candidate route, and
  provide the travel information to the information processing device.

5. A method for providing a travel route to a destination to an occupant of a first vehicle, the method comprising:
  acquiring travel information obtained by a second vehicle that travels on a candidate route to the destination set by the occupant from a second point in time prior to a first point in time when the destination is set by the occupant of the first vehicle, the travel information including first operation information on a windshield wiper of the second vehicle;
  estimating weather information on the candidate route on which the second vehicle travels based on the first operation information on the windshield wiper of the second vehicle, the estimated weather information including information on precipitation and information on humidity, the first operation information on the windshield wiper of the second vehicle having been acquired from an external source;
  deciding an optimal travel route for driving of the first vehicle to the destination based on the acquired travel information and the estimated weather information;
  in a case where the candidate route on which the second vehicle travels is decided as the optimal travel route, deciding an operation mode of air conditioning in a vehicle cabin of the first vehicle when the first vehicle travels on the optimal travel route based on the information on the humidity that is estimated based upon the acquired first operation information that is obtained by the second vehicle, wherein
  the first vehicle autonomously controls itself based upon the optimal travel route and the decided operation mode of the air conditioning,
  deciding the optimal travel route includes deciding the optimal travel route as a route with more precipitation,
  the travel information includes second operation information on hazard lights of the second vehicle including a length of time in which the hazard lights remain on;
  the method further comprises:
    estimating parking and stopping information including whether the second vehicle is parked on the candidate route and whether the second vehicle is parked and stopped on the candidate route based on the acquired second operation information,
    deciding the optimal travel route based on the estimated parking and stopping information,
    in the case where the candidate route on which the second vehicle travels is decided as the optimal travel route, deciding driving information of the first vehicle, including which of a left lane and a right lane to travel in, when the first vehicle travels on the optimal travel route based on the estimated parking and stopping information, and
    determining the second point in time such that an amount of travel information acquired by the second vehicle from the second point in time to the first point in time is equal to or greater than a predetermined threshold value, the predetermined threshold including an amount of travel information needed when deciding the optimal travel route by using the travel information acquired by the second vehicle.

6. The method according to claim 5, wherein the travel information includes at least one of road surface information and curve information on the candidate route on which the second vehicle travels.

7. The method according to claim 6, further comprising deciding, in the case where the candidate route on which the second vehicle travels is decided as the optimal travel route, the driving information of the first vehicle when the first vehicle travels on the optimal travel route based on the at least one of the road surface information and the curve information that is acquired.

8. A first vehicle that presents a travel route to a destination to an occupant of the first vehicle, the first vehicle comprising:
  a controller configured to:
    acquire travel information obtained by a second vehicle that travels on a candidate route to the destination set by the occupant from a second point in time prior to a first point in time when the destination is set by the occupant of the first vehicle, the travel information including first operation information on a windshield wiper of the second vehicle;
    estimate weather information on the candidate route on which the second vehicle travels based on the first operation information on the windshield wiper of the second vehicle, the estimated weather information including information on precipitation and information on humidity, the first operation information on the windshield wiper of the second vehicle having been acquired by the controller from a source external to the first vehicle;
    decide an optimal travel route for driving of the first vehicle to the destination based on the acquired travel information and the estimated weather information;
    in a case where the candidate route on which the second vehicle travels is decided as the optimal travel route, decide an operation modes of air conditioning in a vehicle cabin of the first vehicle when the first vehicle travels on the optimal travel route based on the information on the humidity that is estimated based upon the acquired first operation information that is obtained by the second vehicle; and
    autonomously control the first vehicle based upon the optimal travel route and the decided operation mode of the air conditioning, wherein
  the controller is configured to decide the optimal travel route as a route with more precipitation,
  the travel information includes second operation information on hazard lights of the second vehicle including a length of time in which the hazard lights remain on, and
  the controller is configured to:
    estimate parking and stopping information including whether the second vehicle is parked on the candidate route and whether the second vehicle is parked and stopped on the candidate route based on the acquired second operation information;
    decide the optimal travel route based on the estimated parking and stopping information;
    in the case where the candidate route on which the second vehicle travels is decided as the optimal travel route, the controller decides driving information of the first vehicle, including which of a left lane and a right lane to travel in, when the first vehicle travels on the optimal travel route based on the estimated parking and stopping information; and determine the second point in time such that an amount of travel information acquired by the second vehicle from the second point in time to the first point in time is equal to or greater than a predetermined threshold value, the predetermined threshold including an amount of travel information needed when the controller decides the optimal travel route by using the travel information acquired by the second vehicle.

9. The first vehicle according to claim 8, wherein the travel information includes at least one of road surface information and curve information on the candidate route on which the second vehicle travels.

10. The first vehicle according to claim 9, wherein, in a case where the candidate route on which the second vehicle travels is decided as the optimal travel route, the controller decides the driving information of the first vehicle when the first vehicle travels on the optimal travel route based on the at least one of the road surface information and the curve information that is acquired.

11. The information processing device according to claim 1, wherein
the controller is configured to decide the optimal travel route as a route with high humidity.

12. The information processing device according to claim 3, wherein the first vehicle is configured to autonomously control itself based upon the decided driving information of the first vehicle.

13. The information processing device according to claim 1, wherein the operation mode of the air conditioning is chosen from at least a humidifying mode, a stop mode, and dehumidifying mode.

14. The information processing device according to claim 1, wherein the controller is configured to:
acquire air conditioning information in the vehicle cabin of the second vehicle; and
estimate the weather information based on the acquired air conditioning information in the vehicle cabin of the second vehicle and the first operation information on the windshield wiper of the second vehicle.

15. The information processing device according to claim 1, wherein the controller is configured to:
acquire air conditioning information in the vehicle cabin of the second vehicle when the second vehicle travels on the candidate route; and
in the case where the candidate route on which the second vehicle travels is decided as the optimal travel route, decide the air conditioning information in the vehicle cabin of the second vehicle when the second vehicle travels on the candidate route as air conditioning information in the vehicle cabin of the first vehicle when the first vehicle travels on the optimal travel route.

16. The information processing device according to claim 1, wherein when the second operation information indicates that the hazard lights of the second vehicle remain on for a time that is longer than a predetermined time, the controller is configured to estimate that the second vehicle is parked, and
when the second operation information indicates that the hazard lights of the second vehicle remain on for a time that is shorter than the predetermined time, the controller is configured to estimate that the second vehicle is stopped.

* * * * *